(12) United States Patent
Shetty et al.

(10) Patent No.: US 12,299,458 B2
(45) Date of Patent: May 13, 2025

(54) APPLICATION CONFIGURATION BASED ON RESOURCE IDENTIFIER

(71) Applicant: SAP SE, Walldorf (DE)

(72) Inventors: Arpitha A Shetty, Dakshina Kannada (IN); Devicharan Vinnakota, Bangalore (IN); Vijaya Pramilamma Bovilla, Bangalore (IN); Unmesh Sreedharan, Bangalore (IN)

(73) Assignee: SAP SE, Walldorf (DE)

( * ) Notice: Subject to any disclaimer, the term of this patent is extended or adjusted under 35 U.S.C. 154(b) by 572 days.

(21) Appl. No.: 17/523,736

(22) Filed: Nov. 10, 2021

(65) Prior Publication Data

US 2023/0141418 A1    May 11, 2023

(51) Int. Cl.
| | | |
|---|---|---|
| G06F 9/46 | (2006.01) | |
| G06F 9/445 | (2018.01) | |
| G06F 9/451 | (2018.01) | |
| G06F 16/22 | (2019.01) | |
| G06F 16/23 | (2019.01) | |
| H04L 41/0806 | (2022.01) | |
| H04L 67/141 | (2022.01) | |

(52) U.S. Cl.
CPC ......... *G06F 9/44505* (2013.01); *G06F 9/451* (2018.02); *G06F 16/2255* (2019.01); *G06F 16/2379* (2019.01); *H04L 41/0806* (2013.01); *H04L 67/141* (2013.01)

(58) Field of Classification Search
CPC .................................................. G06F 9/44505
USPC ....................................................... 718/105
See application file for complete search history.

(56) References Cited

U.S. PATENT DOCUMENTS

| | | | | |
|---|---|---|---|---|
| 7,254,631 | B2* | 8/2007 | Crudele | G06F 8/61 |
| | | | | 709/224 |
| 8,161,100 | B1* | 4/2012 | Lopez | H04W 4/50 |
| | | | | 709/239 |
| 9,400,660 | B1* | 7/2016 | Krivopaltsev | G06F 9/451 |
| 9,509,625 | B2* | 11/2016 | Hotes | H04L 41/0806 |
| 10,063,490 | B2* | 8/2018 | Wang | H04L 41/0803 |
| 10,084,861 | B2* | 9/2018 | Rosa | H04L 69/329 |
| 10,725,759 | B2* | 7/2020 | Tanabe | G06F 8/65 |
| 10,726,095 | B1* | 7/2020 | Pallemulle | G06F 16/9577 |
| 11,159,625 | B1* | 10/2021 | Vyas | H04L 67/141 |
| 11,641,393 | B1* | 5/2023 | Shetty | H04L 67/1029 |
| | | | | 709/223 |
| 11,665,268 | B2* | 5/2023 | Shankar | G06F 9/54 |
| | | | | 719/328 |

(Continued)

*Primary Examiner* — Mehran Kamran
(74) *Attorney, Agent, or Firm* — Fountainhead Law Group, PC

(57) ABSTRACT

Systems, methods, and techniques for implementing a defined configuration for an application. A request is received to provision an instance of an application for a external entity. A resource identifier is obtained based on the request. A defined configuration of a plurality of defined configurations for the application is identified based on the resource identifier. A set of features is determined that are specified in the defined configuration. The instance of the application is generated having the set of features. A connection is established with an application resource of a plurality of application resources of the application based on the resource identifier. The instance having the set of features is provisioned over one or more networks to the external entity.

18 Claims, 10 Drawing Sheets

(56) References Cited

U.S. PATENT DOCUMENTS

| | | | |
|---|---|---|---|
| 2003/0101245 A1* | 5/2003 | Srinivasan | H04L 67/14 709/221 |
| 2009/0204711 A1* | 8/2009 | Binyamin | H04L 67/51 709/226 |
| 2013/0031527 A1* | 1/2013 | Granholm | G06F 9/453 717/101 |
| 2014/0280796 A1* | 9/2014 | Pijewski | H04L 41/0803 709/220 |
| 2014/0379811 A1* | 12/2014 | Chan | H04W 8/24 709/205 |
| 2015/0089031 A1* | 3/2015 | Kalali | H04L 67/34 709/220 |
| 2015/0135084 A1* | 5/2015 | Rosenberger | G06Q 10/0637 715/738 |
| 2015/0143244 A1* | 5/2015 | Koo | H04L 41/0803 715/735 |
| 2015/0160931 A1* | 6/2015 | Glazer | G06F 9/452 717/109 |
| 2016/0127254 A1* | 5/2016 | Kumar | H04L 67/567 709/226 |
| 2016/0132870 A1* | 5/2016 | Xu | G06Q 20/382 705/21 |
| 2016/0283566 A1* | 9/2016 | Singh | G06F 16/248 |
| 2016/0358237 A1* | 12/2016 | Mohammed | G06Q 30/06 |
| 2017/0104629 A1* | 4/2017 | Cobb | H04L 41/142 |
| 2017/0329505 A1* | 11/2017 | Richter | G06F 8/38 |
| 2018/0176097 A1* | 6/2018 | Russell | H04L 41/22 |
| 2019/0050775 A1* | 2/2019 | Bijor | H04L 67/34 |
| 2019/0104125 A1* | 4/2019 | Dearment | G06F 8/60 |
| 2019/0278589 A1* | 9/2019 | Cook | G06F 8/36 |
| 2019/0288922 A1* | 9/2019 | Viklund | H04L 67/10 |
| 2019/0303466 A1* | 10/2019 | Khurana | G06F 16/24568 |
| 2020/0097161 A1* | 3/2020 | Gonzalez | G06F 3/04847 |
| 2020/0275413 A1* | 8/2020 | Zhang | H04W 80/02 |
| 2020/0403994 A1* | 12/2020 | Bitterfeld | H04L 67/53 |
| 2021/0117056 A1* | 4/2021 | Kuo | G06F 3/0484 |
| 2021/0232273 A1* | 7/2021 | Gupta | G06F 3/0482 |
| 2021/0342128 A1* | 11/2021 | Carraway | G06F 9/451 |
| 2022/0012351 A1* | 1/2022 | Sanders | G06F 21/577 |
| 2022/0263729 A1* | 8/2022 | Lee | H04L 47/785 |
| 2023/0039601 A1* | 2/2023 | Kattimani | G06F 8/60 |
| 2023/0141418 A1* | 5/2023 | Shetty | G06F 16/2379 718/100 |
| 2023/0188477 A1* | 6/2023 | Zeng | H04L 47/762 709/218 |
| 2023/0195726 A1* | 6/2023 | Pandis | G06F 16/24542 707/718 |

* cited by examiner

APPLICATION CONFIGURATION BASED ON RESOURCE IDENTIFIER

BACKGROUND

The present disclosure relates to computing, and more particularly, to customization of features of a cloud-computing system.

The use of cloud computing services is a popular solution to accommodate the growing needs of businesses and even individuals (e.g., in the context of gaming). A cloud-based computing resource service provider may develop applications and software for servicing a plurality of entities in different industries or having different use cases. In some instances, multiple entities may wish to use the same application, but different entities may wish to access different features of the application.

Customizing features of a cloud-computing application presents a complex challenge to a service provider. Modifying an application according to each user's desired features would be a resource and time intensive endeavor for the cloud-computing resource service provider. On the other hand, providing the user with access to potentially sensitive systems and source code could expose the cloud-computing resource service provider to theft of valuable intellectual property. Moreover, the user may have to procure or redirect the skills of valuable computer scientists to understand and adapt the cloud-based applications to meet the user's desired feature set.

SUMMARY

Embodiments of the present disclosure include systems and methods for configuring an application based on a resource identifier. The techniques described herein may be embodied in non-transitory machine-readable medium storing a program executable by a computer system, the program comprising sets of instructions for performing as described herein. In some embodiments, a system includes one or more processors and one or more non-transitory machine-readable media storing instructions that when executed by at least one of the one or more processors cause at least one of the one or more processors to perform as described herein. In some embodiments, the non-transitory machine-readable medium may be memory, for example, which may be coupled to the aforementioned one or more processors, for example.

The following techniques and features may be embodied alone or in different combinations and may further be embodied with other techniques and features described herein.

The present disclosure includes a method receiving a first request to provision a first instance of an application for a first external entity; obtaining a first resource identifier based on the first request; identifying a first defined configuration of a plurality of defined configurations for the application based on the first resource identifier; determining a first set of features specified in the first defined configuration; generating the first instance having the first set of features; establishing a connection with a first application resource of a plurality of application resources of the application based on the first resource identifier; and provisioning, over one or more networks, the first instance having the first set of features to the first external entity.

In some embodiments, the method comprises receiving a second request to provision a second instance of the application for a second external entity; obtaining a second resource identifier based on the second request; identifying a second defined configuration of the plurality of defined configurations for the application based on the second resource identifier; determining a second set of features specified in the second defined configuration; generating the second instance having the second set of features; establishing a connection with a second application resource of the plurality of application resources of the application based on the second resource identifier; and provisioning, over one or more networks, the second instance having the second set of features to the second external entity.

In some embodiments, the first resource identifier is extracted from a path in a web address included in the first request. In some embodiments, the first resource identifier is obtained from data storage based on authentication information provided by the first external entity. In some embodiments, the first application resource is configured to perform operations to support the first set of features of the first defined configuration.

In some embodiments, the method comprises updating a data structure to include associations between states for the first set of features and hash values associated with the first set of features, wherein the first instance is generated based on the data structure.

In some embodiments, generating the first instance includes generating a user interface having the first set of features, the user interface having an arrangement specified in the first defined configuration. In some embodiments, the method comprises accessing, by the first application resource, data that is associated with the first external entity in data storage, wherein the user interface includes a feature representing the data accessed.

In some embodiments, the method comprises comparing the first resource identifier with a plurality of identifiers that are respectively associated with the plurality of defined configurations; and determining that the first resource identifier is a match with an identifier of the first defined configuration, wherein the first defined configuration is identified based on the match.

The present disclosure includes a system, comprising: one or more processors; and memory storing instructions that, as a result of execution by the one or more processors, cause the system to receive a request to provision an instance of an application for an external entity; obtain a resource identifier based on the request; identify a defined configuration of a plurality of defined configurations for the application based on the resource identifier; determine a set of features specified in the defined configuration; generate the instance having the set of features; establish a connection with an application resource of a plurality of application resources of the application, the application resource corresponding to the resource identifier; and provision, over one or more networks, the instance having the set of features to the external entity.

In some embodiments, the resource identifier is extracted from a path in a web address included in the request. In some embodiments, the application resource is configured to perform operations to support the set of features of the defined configuration.

In some embodiments, execution of the instructions by the one or more processors causes the system to update a data structure to include associations between states for the set of features and hash values associated with the set of features, wherein the instance is generated based on the data structure.

In some embodiments, execution of the instructions by the one or more processors causes the system to access, by the application resource, data that is associated with the external entity in data storage, wherein the instance provisioned includes a feature representing the data accessed.

The present disclosure includes one or more non-transitory computer readable media storing instructions that, as a result of execution by one or more processors, cause the one or more processors to receive a request to provision an instance of an application for an external entity; obtain a resource identifier based on the request; identify a defined configuration of a plurality of defined configurations for the application based on the resource identifier; determine a set of features specified in the defined configuration; generate the instance having the set of features; establish a connection between an application resource of a plurality of application resources and the application based on a correspondence of the application resource to the resource identifier; and provision, over one or more networks, the instance having the set of features to the external entity.

In some embodiments, the resource identifier is extracted from a path in a web address included in the request. In some embodiments, the resource identifier is obtained from data storage based on authentication information provided by the external entity.

In some embodiments, execution of the instructions stored on the one or more non-transitory computer readable media causes the one or more processors to update a data structure to include associations between states for the set of features and hash values associated with the set of features, wherein the instance is generated based on the data structure.

In some embodiments, execution of the instructions stored on the one or more non-transitory computer readable media causes the one or more processors to compare the resource identifier with a plurality of identifiers that are respectively associated with the plurality of defined configurations; and determine that the resource identifier is a match with an identifier of the defined configuration, wherein the defined configuration is identified based on the match.

In some embodiments, execution of the instructions stored on the one or more non-transitory computer readable media causes the one or more processors to access, by the application resource, data that is associated with the external entity in data storage, wherein the user interface includes a feature representing the data accessed.

The following detailed description and accompanying drawings provide a more thorough understanding of the nature and advantages of the present disclosure.

DETAILED DESCRIPTION

Described herein are techniques for configuring an application based on a resource identifier according to one or more embodiments. The systems, apparatuses, methods, and techniques described below may be implemented as a computer program (e.g., software, application) executing on one or more computer systems. The computer program may further be stored on one or more computer-readable media. The computer-readable media may store instructions that, as a result of execution by one or more processors of a computer system, cause the computer system to perform operations described herein.

In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 1:
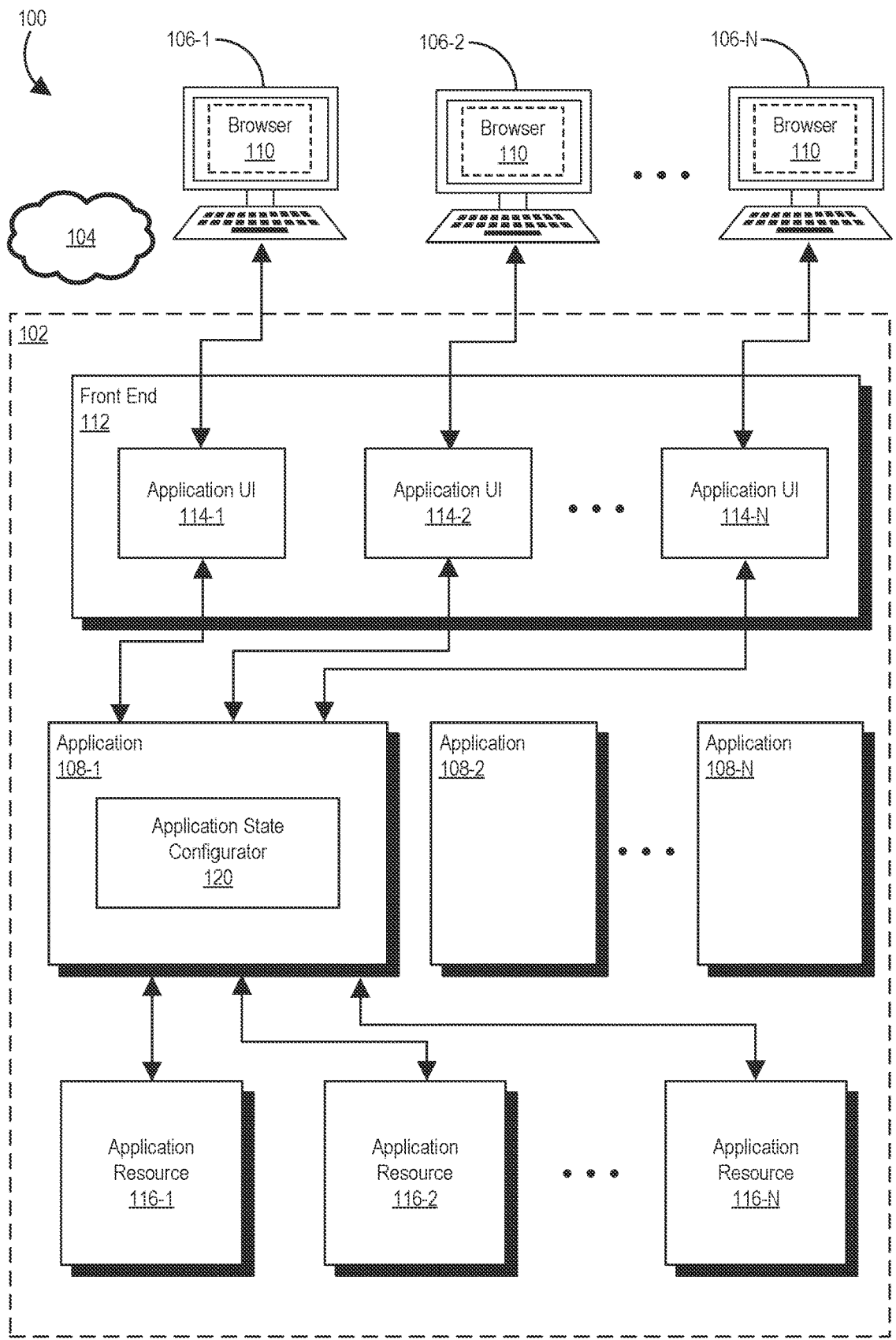
FIG. 1 illustrates a first environment including a computer system for configuring an application based on a resource identifier according to one or more embodiments.

FIG. 1 illustrates an environment 100 including a computer system 102 for configuring an application based on a resource identifier according to one or more embodiments. The computer system 102 may be of a computing resources services provider that provides cloud-based services to customer entities over one or more networks 104. More particularly, a set of computing systems 106-1, 106-2, . . . 106-N (collectively "computing systems 106") of one or more customer entities may communicate, over the one or more networks 104, with the computing system 102 to interact with an application 108-1 of the computing resources service provider. The computing systems 106 may be equipped with a program, such as an internet browser 110, through which a user may interact with the application 108-1 on behalf of the entity. The computing system 102 may be a distributed computing system in which a plurality of processor-based devices (e.g., servers) operate to provide, over the one or more networks 104, services and applications described herein.

The computing system 102 includes a front-end layer 112 that facilitates interaction with the application 108-1, e.g., via a set of application user interfaces 114-1, 114-2, . . . 114-N. The front-end layer 112 may be a gateway to the application 108-1 and services provided by the application 108-1. Authorization or user authentication of the computing systems 106 may be required for access to the front-end layer 112, the application 108-1, and/or data exchanges through the front-end layer 112. For example, the front-end layer 112 may enable a web-based platform or a consolebased platform that provides information related to the application 108-1 and services of the computing resource service provider to an external entity. The front-end layer 112 may enable the entity to execute applications or tasks in the computing resource service provider, track and manage operation of and interactions with the application 108-1, receive the results of the execution, and transmit the results to the computing systems 106. As further described herein, the front-end layer 112 may be the gateway by which the entities and/or the computer systems 106 may utilize the application 108-1 and services provided through the application 108-1 that are provided by the computing resource service provider. In some embodiments, the front-end layer 112 may be configured with an Application Programming Interface (API) through which the computing systems 106 may interact with the application 108-1.

Different customer entities associated with the computer systems 106 may desire a different configuration for the application 108-1. Each application configuration for the application 108-1 may include a set of user interface elements, a set of features, and/or functionality that are different than other application configurations for the application 108-1. The application 108-1 may be one of a plurality of applications provided by the computing resources service provider. Non-limiting examples of the application 108-1 include a cloud computing application that provides compute capacity, such as virtual machines and data storage; a database application; an application for streaming and processing audiovisual media; an application for managing internet-of-things data and devices; and/an application for building, deploying, and/or managing mobile and web software. Entities associated with the computer systems 106 may desire to use the application 108-1, but each entity may be involved in a different industry or have a different purpose.

As a specific, non-limiting example, the application 108-1 may be an analytics application for collecting, analyzing, and presenting data. A first user associated with a first computer system 106-1 may wish to use the analytics application for enterprise resource planning. A second user associated with a second computer system 106-2 may wish to use the analytics application for human resource management. A third user associated with a third computer system 106-3 may wish to use the analytics application for supply chain management. Although all three users may use the same application 108-1, a different configuration, such as different functionality, different user interface elements, and/or a different layout, may be appropriate for different users. As discussed above, it is onerous and inefficient for the user(s) or the computing resource service provider to customize the application 108-1 for each use case. The application 108-1 may be a single application of a plurality of applications 108-1, 108-2, . . . 108-N (collectively "applications 108") provided by the computing resources service provider.

The computer system 102 includes a plurality of application resources 116-1, 116-2, . . . 116-N (collectively "application resources 116") that support features for the application 108-1. More particularly, each of the application resources 116 has a different set of capabilities and settings that modify the functionality, user interface elements, and/or other features of the application 108-1 in a corresponding one of the computer systems 106. In some embodiments, the application resources 116 are independent from one another and do not interact with each other. Each of the application resources 116 may be provided with a data source specific to the application service. During operation of the computer system 102, for example, the computer system 106-1 implementing the application resource 116-1 with the application may access a first data source allocated to the application resource 116-1 but may be unable to access a second data source allocated to the application resource 116-2.

Each of the application resources 116 may be of the same application type but may have a different set of capabilities. As a non-limiting example, the application 108-1 may be an analytics application that collects, analyzes, and presents data. Each of the application resources 116 may be provided with a set of capabilities for a particular purpose or intended use. The application resource 116-1 may be for financial analytics, the application resource 116-2 may be for supply chain analytics, a third application resource 116-3 may be for healthcare, and so on. As described herein, one or more of the application resources 116 may be further customized according to a user's preferences. Each of the application resources 116 may include a set of processor-based devices (e.g., servers) that are configured to implement a particular set of features for the application 108-1, as described herein.

In connection with a request to access the application 108-1 from one of the computer systems 106, the front-end layer 112 receives service information regarding an application resource 116 to be utilized with the application 108-1. The application 108-1 includes an application state configurator 120 that implements a configuration for an instance of the application 108-1 based on a resource identifier included in a request by one of the computer systems 106. More specifically, based on a resource identifier included in a request to provision an instance of the application 108-1, the application state configurator 120 configures the features of the instance of the application 108-1 provided via an application user interface 114 to a corresponding one of the computer systems 106.

The one or more networks 104 may include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server for receiving requests and serving content in response thereto, although for other networks an alternative device serving a similar purpose could be used as would be apparent to one of ordinary skill in the art.

The computer system 102 includes one or more servers and data stores associated with individual servers. It should be understood that there can be several servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store", "data storage", or "memory" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the external entity.

Figure 2:
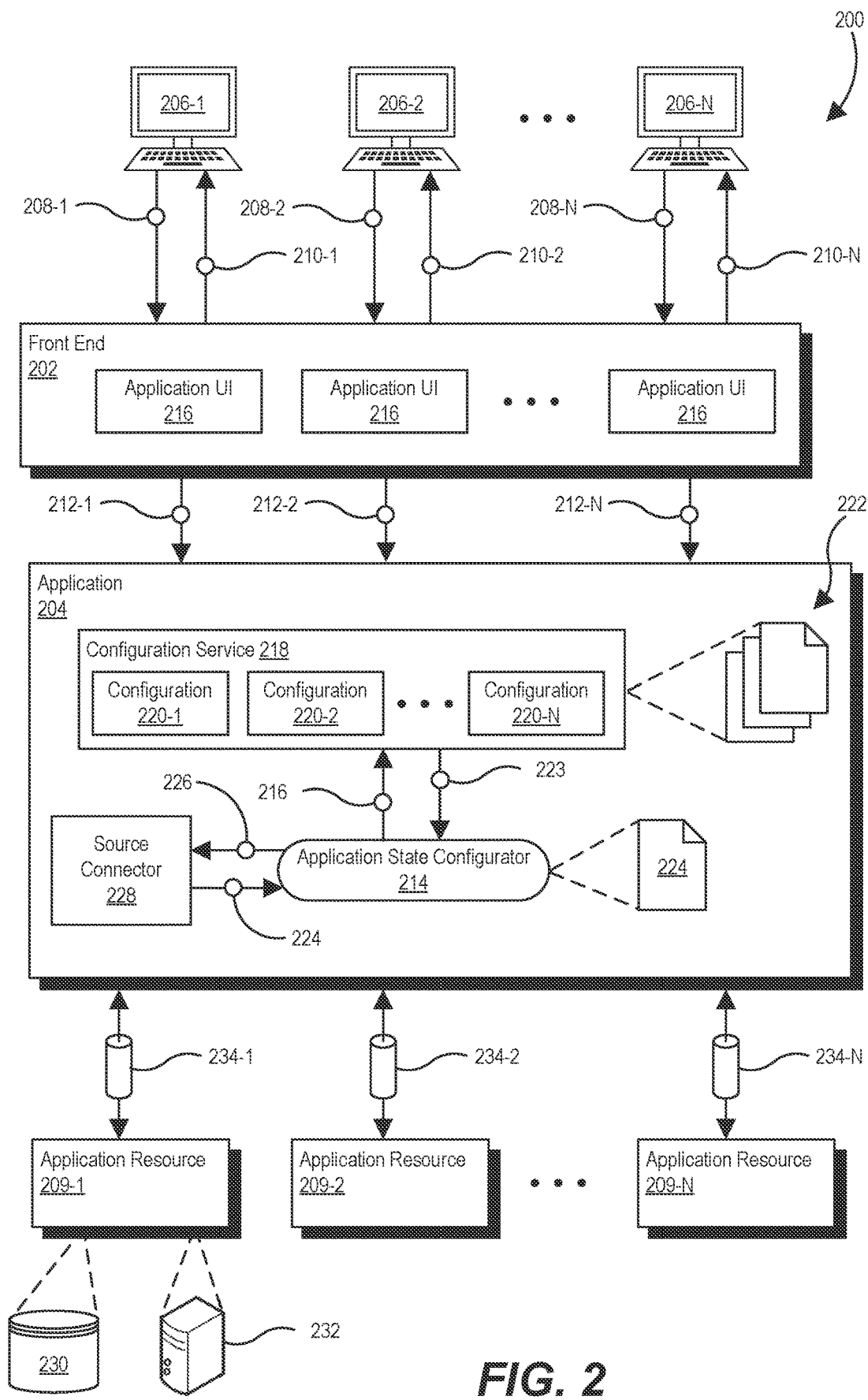
FIG. 2 illustrates a second environment in which a computing system of a computing resources service provider operates according to one or more embodiments.

FIG. 2 shows an environment 200 in which a computing system of a computing resources service provider operates according to one or more embodiments. The computing system includes a front-end layer 202 and an application 204, as described with respect to FIG. 1. In the environment 200, a plurality of external computer systems 206-1, 206-2, . . . 206-N respectively send requests 208-1, 208-2, . . . 208-N (collectively "requests 208"; individually "request 208") to the front-end layer 202 to provision the application 204. The front-end layer 202 processes the requests 208 to determine an application resource of a plurality of application resources 209-1, 209-2, . . . 209-N (collectively "application resources 209;" individually "application resource 209") to be implemented in connection with provisioning the application 204.

One or more of the requests 208 may include a resource identifier for an application resource of the application resources 209 to be implemented in connection with provisioning the application 204. For instance, the requests 208 may include a parameter that includes a resource identifier identifying a particular application resource of the application resources 209. The resource identifier, in some embodiments, is part of a uniform resource locator (URL). As a particular, non-limiting example, the URL may include a host identifier comprising one or more of a subdomain, a second-level domain, and a top domain; may include a path providing the resource identifier. In some embodiments, the path may include a path component and a query string in which the resource identifier is included. In some implementations, one or more of the requests 208 may include information identifying the entity or entities associated with a request. For instance, the requests 208 may include an alphanumeric string that is unique to the requesting entity.

The information indicating an application resource of the application resources 209 to be implemented may be generated by the computing systems 206 using information provided by the front-end layer 202. For instance, as a result of the computer systems 206 accessing the front-end layer 202, the front-end layer 202 may issue requests for input 210-1, 210-2, . . . 210-N (collectively "requests 210;" individually "request 210") respectively to the computer systems 206-1, 206-2, . . . 206-N. As a result of processing the requests 210, the computer systems 206 may each provide a user interface with which a user may interact to provide input causing the application 204 to determine an application resource of the application resources 209 to be implemented for the application 204.

In some embodiments, the requests 208 may be provided as a result of authorizing or authenticating the computer systems 206 via the front-end layer 202. As an example, the requests 210 provided by the front-end layer 202 may include requests to provide authentication information respectively to the computer systems 206-1, 206-2, . . . 206-N as a condition for provisioning the application 204. The requests 210 may include instructions that, as a result of execution by one or more processors of the computer systems 206, causes the computer systems 206 to present a user interface for providing authentication credentials, such as a username/password combination, two-factor authentication, an authentication device, etc. The front-end layer 202 may obtain information regarding the user requesting the application 204, such as account information stored in a user data store.

The front-end layer 202 may process the requests 208-1, 208-2, . . . 208-N to obtain a resource identifier that identifies an application resource of the application resources 209 to be provisioned with the application 204 for the computer systems 206. Processing may include parsing a URL or other similar information provided in the requests 208 to obtain the resource identifier. The resource identifier(s) in the requests 208 may indicate an application resource of the application resources 209 to be implemented in connection with fulfillment of the request(s) 208. In some implementations, the resource identifier may include information specific to the users of the computer systems 206, such as account information of the user, which can be used to determine feature customizations for the application 204.

The front-end layer 202 provides requests 212-1, 212-2, . . . 212-N (collectively "requests 212;" individually "request 212") to the application 204 to provision an instance of the application 204 using one of the application resources 209 corresponding to a resource identifier included in one of the request(s) 208. The requests 212 may include the resource identifier parsed from the requests 208. In some embodiments, the requests 212 may include information identifying the requesting entity, such as a username or an account number. In response to receiving a request 212, the application 204 performs a process for connecting with a corresponding application resource of the application resources 209 and implementing a defined configuration for the instance of the application 204 to be provisioned to a requesting computer system 206. In some embodiments, the resource identifier may be obtained from information other than a URL, such as via tenant provisioning or via a post message handler, by way of non-limiting example.

The application 204 includes an application state configurator 214 that configures a state of the application 204 to be provisioned to a computer system 206 based at least in part on the request 208 provided by the computer system. The application state configurator 214 may be a software module executing on one or more processors of a computer system of the computing resources service provider, such as the computer system 102 of FIG. 1. The application state configurator 214 implements a defined configuration of the application 204 based on the request 208.

The application 204 further includes a configuration service 218 that determines a defined configuration of a plurality of defined configurations 220 to be implemented to fulfill the request(s) 208. The configuration service 218 obtains parameters provided with the requests 208 and may evaluate the parameters to confirm whether a valid resource identifier is included in the parameters. For example, the configuration service 218 may receive the request 212-1 from the front-end layer 202, the request 212-1 including a parameter in the request 208-1. The configuration service 218 may parse the request 212-1 to determine whether the request 212-1 includes a valid resource identifier.

As a result of determining that the request 212-1 includes a valid resource identifier, the configuration service 218 determines a defined configuration for the application 204. In some embodiments, the application state configurator 214 may send a request 216 to provide a defined configuration for the application 204, the request 216 including the parameters in the request 212-1. In such embodiments, the application state configurator 214 may parse the resource identifier from the request 212-1 and provide the resource identifier, or other resource identifying information derived from the request 212, to the configuration service 218 with the request 216.

The configuration service 216 may include or have access to data storage storing a set of defined configurations 220-1, 220-2, . . . 220-N (collectively "configurations 220") for the application 204. The defined configurations 220 may each correspond to a default configuration for the application resource 209 to be implemented for the application 204. The defined configuration 220-1, for example, may provide a configuration for an enterprise analytics purpose, the defined configuration 220-2 may provide a default configuration for a supply chain analytics use case, etc. One of the defined configurations 220 may be a default configuration that is implemented, e.g., in the absence of a resource identifier being provided in one of the requests 208.

The configuration service 216 selects one of the defined configurations 220 based on the resource identifier obtained. As previously discussed, the resource identifier may be provided by one of the computer systems 206 in a corresponding one of the requests 208. The configuration service 218 determines a defined configuration of the plurality of the configurations 220 that corresponds to the resource identifier. The configuration service 218 may compare the resource identifier in the request 212 or the request 216 with identifiers associated with each of the defined configurations 220. As a result of determining a match between the resource identifier and an identifier associated with a defined configuration of the defined configurations 220, the configuration service 218 may determine settings for various features of the application 204.

The configuration service 218 may store or have access to a plurality of configuration settings 222 that each correspond to one of the defined configurations 220. Each of the configuration settings 222 may specify a set of features and associated settings for each feature indicating whether the feature is to be enabled, disabled, supported, or otherwise modified in an instance of the application 204 provided to one of the computer systems 206.

As a non-limiting example, with reference to Table 1 below, a first one of the configuration settings 222 may specify that a toolbar is to be hidden, a certain color scheme to be used for displaying the application 204, whether certain data presentations are to be displayed (e.g., dashboard, histograms, charts), whether certain widgets are to be supported, a landing or splash page to be displayed for the application 204, whether internal post messages specific to the requesting entity (e.g., computer system 206-1) are to be called, whether data querying is to be supported, and whether metadata gathering and/or storing is to be supported. Although the configuration settings shown below are in a tabular format, the configuration settings may have a different format without departing from the scope of the present disclosure. For instance, the configuration settings may be provided in a list format, in a delimiter-separated value format (e.g., comma-separated value format), in an object-oriented format (e.g., data.prototype.feature(argument)), or in any other appropriate format. In some embodiments, each of the configuration settings 222 may be a different data structure that is referenced by the resource identifier. In some embodiments, a single data object or structure may be provided that includes the configuration settings 222.

TABLE 1

Example Configuration Settings

| Identifier | Configuration1 |
|---|---|
| Toolbar | Hide |
| Color Scheme | (2, 5, 1) |
| Dashboard1 | Enable |
| Widget1 | Disable |
| LandingPage | Page1 |
| PostMessages | Enable |
| Query | Disable |
| Metadata | Enable |

As a result of determining configuration settings of the plurality of configuration settings 222 that correspond to the resource identifier, the configuration service 218 provides a response 223 to the application state configurator 214 regarding the configuration settings to be implemented for an instance of the application 204 to be provisioned to one of the computer systems 206. The response 223 may include a command having arguments indicating the configuration settings to be implemented. In some embodiments, the response 223 of the configuration service 218 may cause a plurality of flags to be set for an application instance to be provisioned. The application state configurator 214 may be considered as a single source of truth for every instance of the application 204. In some embodiments, the application state configurator 214 may include or have access to a data structure 224, such as a hash map, a hash table, or a look up table, specifying a value or Boolean for each feature.

A data structure 224 may be generated or updated for each instance of the application 204 to be provisioned. Table 2 shows a non-limiting example of the data structure 224, in which a ShareButton is disabled, a QueryTool and Dashboard1 are enabled, and a LandingPage is set to a particular page. In the data structure 224, the hash values are generated based on the feature, such as a hash generated based on a name of the feature. The values associated with the hash values indicate states for the associated feature. For instance, a value of zero may indicate that the feature is disabled in the application instance, a value of one may indicate that the feature is enabled in the application instance, and other values may indicate a defined state for the feature in the application instance.

TABLE 2

Example Data Structure 224

| Feature | Hash | Value |
|---|---|---|
| ShareButton | 34983423402043 | 0 |
| QueryTool | 64785966142341 | 1 |
| Dashboard1 | 31230123120323 | 1 |
| . . . | . . . | . . . |
| LandingPage | 57872246887156 | 20 |

In response to receiving the request(s) 212, the application state configurator 214 sends a request 226 to a resource connector 228 to determine a set of capabilities to be provided with the instance of the application 204. The request 226 includes information specifying which of the application resources 209 is indicated for implementation in the request 208. As discussed herein, the request 226 may include the resource identifier that corresponds to one of the application resources 209 to be implemented. The resource connector 228 interacts with the application resource 209 specified to determine the capabilities to be provided.

Each application resource 209 may include a data store 230 that stores data specific to one or more of the computer systems 230. For instance, the data store 230 for the application resource 209-1 may store information indicating a set of customizations associated with the computer system 206-1 to be implemented along with the defined configuration 220-1. The application resources 209 may each include one or more processor-based devices 232 (e.g., servers) that are configured to support or provide particular features of the corresponding defined configuration. The application resource 209-1, for example, may have a set of servers that are configured to perform operations corresponding to one or more of the features in the defined configuration 220-1. The application resource 209-1 may be configured to support customized features for the application.

The resource connector 228 may establish connections 234-1, 234-2, . . . 234-N between the application 204 and individual resources of the application resources 209 as appropriate to support features to be implemented in an instance of the application 204. Establishing a connection may include establishing a data connection between the application and the application resource using one or more communication protocols, such as Hypertext Transfer Protocol (HTTP), Hypertext Transfer Protocol Secure (HTTPS), Transport Layer Security (TLS) Protocol, Transmission Control Protocol/Internet Protocol (TCP/IP), User Datagram Protocol (UDP), and/or Real-time Transport Protocol (RTP), by way of non-limiting example. In some embodiments, establishing a connection may include establishing a connection via a virtual private network (VPN) using one or more VPN protocols.

Figure 3:
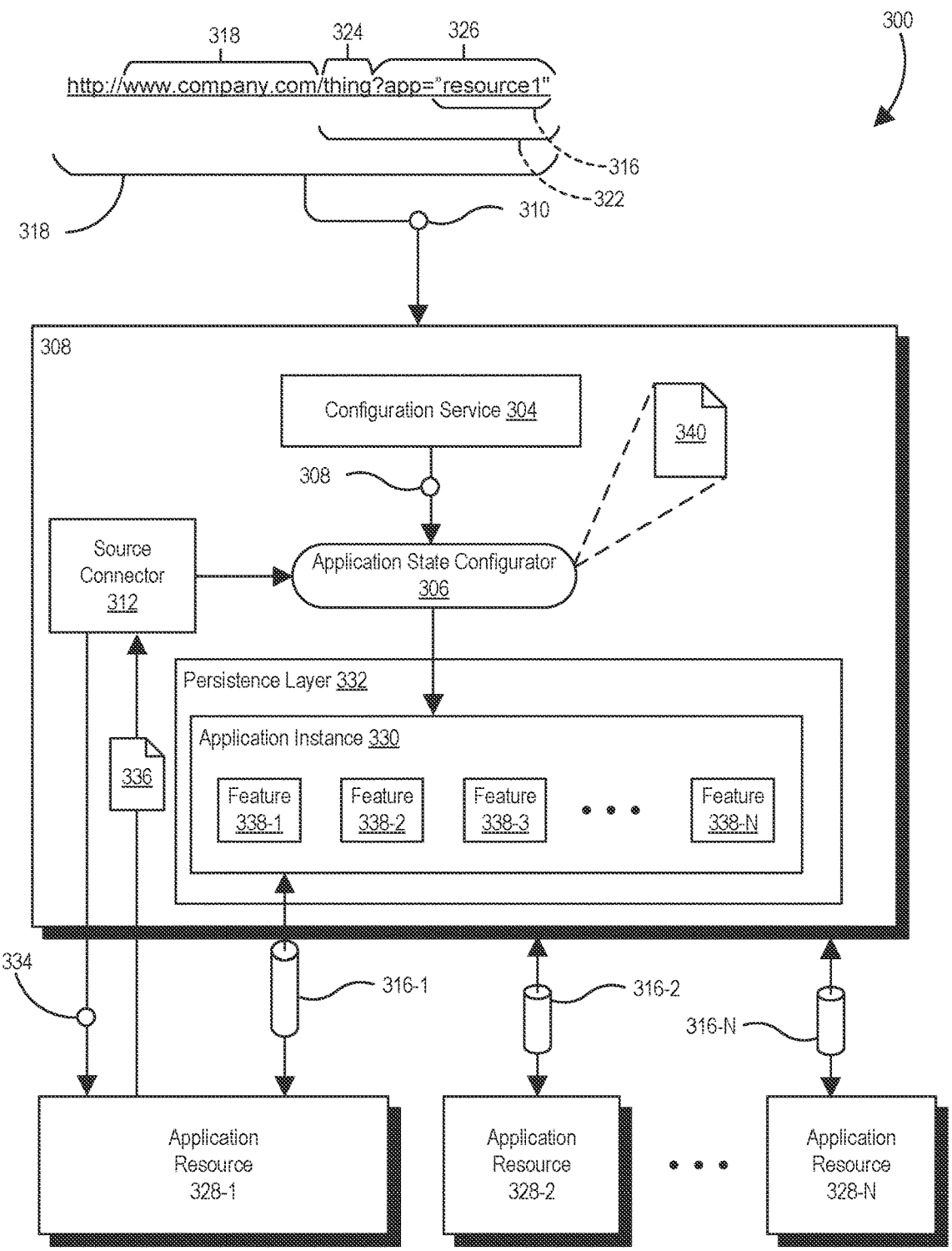
FIG. 3 illustrates a third environment in which a computing system of a computing resources service provider operates according to one or more embodiments.

FIG. 3 shows an environment 300 in which a computing system of a computing resources service provider operates according to one or more embodiments. Various features of and described with respect to FIG. 3 are substantially similar to features described with respect to FIGS. 1, 2, and elsewhere herein, so further description thereof is omitted for brevity. An application 302 of the computing resources service provider includes a configuration service 304 and an application state configurator 306 that receives a defined configuration 308 from the configuration service 304, the defined configuration 308 based on a request 310 received from a front-end layer. The application 302 also includes a resource connector 312 that establishes connections 316-1, 316-2, . . . 316-N (collectively "connections 316") between a plurality of one or more of the application resources 314-1, 314-2, . . . 314-N indicated in the request 310 and the application 302.

The application 302 receives the request 310 from the front-end layer described with respect to FIGS. 1, 2, and elsewhere herein. The request 310 is to provision an application instance having a defined configuration corresponding to a resource identifier 316 in an input 318 provided by a computer system of an external entity, such as a request from one of the computer systems 106 of FIG. 1. The input 318 includes a host identifier 320 of the computing resources service provider and a path 322 for initiating an instance of the application 302. The host identifier 318 may include one or more of a subdomain, a second-level domain, and a top domain. The path 322 may include a primary path component 324 and a second path component 326. In some embodiments, the resource identifier 316 is included in the path 322 and the resource identifier 322. In some embodiments, the resource identifier 316 is obtained based on the request 310. For instance, the application 308 may access data storage to retrieve information associated with the user based on authentication credentials provided by the user. The information retrieved may include the resource identifier 316, as selected by the user in a setup process.

With reference to FIG. 3, the host identifier 318 identifies the website through which the application 302 is accessed. The primary path component 324 of the path 322 may identify the application 302 in the host that the web client wants to access—for instance, "thing" shown in the primary path component 324 may correspond to an identifier for the application 302. The second path component 326 may be generated as a result of a user initiating a request to provide a defined configuration for the application 302, which may include authentication of a user's credentials via a user interface (UI) of the application 302. As a more particular example, the second path component 326 may include a query string that follows primary path component 324 and provides a string of information that identifies an application resource 328-1 of a plurality of application resources 328-1, 328-2, . . . 328-N accessible by the application 302. can use for some purpose (for example, as parameters for a search or as data to be processed). The query string may include a query portion (e.g., "app=") and an alphanumeric value (e.g., "resource1") providing a response to the query portion. The query string may be generated as a result of user input to the front-end layer 112, 202 via one of the computer systems 106, such as authentication of a user's credentials or an input to access a resource associated with an external entity.

As a result of the application 302 receiving the request 310, the configuration service 304 determines a defined configuration 308 of a plurality of defined configurations to be applied to an instance of the application 304. The configuration service 304 provides the defined configuration 308 to the application state configurator 306. The application state configurator 306 generates an application instance 330 having a configuration based at least in part on the defined configuration 308 determined.

The application 302 may include an application persistence layer 332 in which information for executing the application 302 in the application configuration 330 is maintained. The application persistence layer 332 may include various types of memory, such as random-access memory, read-only memory, cache memory, etc., for storing data regarding operation of the application 302. Data obtained from the application resource data store may be stored, operated on, and otherwise manipulated in the persistence layer 332 during operation of the application 302 in the application configuration 330. Data manipulated in the persistence layer 332 or generated during operation of the application 302 in the application configuration 330 may be stored in the application resource data store periodically or when operation of the application 302 is discontinued so that the data can be later retrieved. The persistence layer 332 may be embodied as a region of memory (e.g., random access memory, random access memory) of the computing resources service provider allocated to store instances of the application 302 at least during runtime.

In connection with generating the application instance 330, the resource connector 312 establishes a connection 316-1 with the application resource 328-1 that corresponds with the resource identifier 316. The resource connector 312 may send a request 334 to the application resource 328-1 to specify a set of capabilities that the application resource 328-1 is capable of performing. The application resource 328-1 may be embodied as one or more processor-based devices (e.g., servers) executing a set of instructions stored in memory.

One or more processor-based devices of the application resource 328-1 may be separate than a processor-based device operating to implement the application 304. More particularly, the application resource 328-1 may be configured (e.g., with executable instructions) to perform particular operations and obtain data involved fulfilling a full set of capabilities of the application resource 328-1. For example, the application resource 328-1 may be specifically configured to perform analysis and operations involved in enterprise resource planning, such as financial accounting and production planning. As another example, the application resource 328-1 may be specifically configured to perform analysis and operations involved in supply chain management. As yet another example, the application resource 328-1 may be specifically configured to perform analysis and operations involved in healthcare management. The application resource 328-1 may be considered to be a back-end of the application 302 that performs operations and stores data on behalf of the application 302.

The request 334 may be generated according to an application-layer protocol and transmitted between to processor-based devices (e.g., servers) of the computing resources service provider. For instance, the request 334 may be formatted according to a Hypertext Transfer Protocol (HTTP) and include a request to obtain information regarding one or more of the processor-based devices associated with the application resource 328-1 (e.g., getServerInfo request). The request 334, in some implementations, may include information identifying the entity that provided the request 208-1 described with respect to FIG. 2, such as a username or an account identifier.

The application resource 328-1 may include an integration layer that facilitates integration of features of the application resource 328-1 with the application 302. The application resource 328-1 may include a service capabilities module that tracks and maintains a record of the capabilities of the application resource 328-1. The capabilities of the application resource 328-1 include functional features specific to the particular purpose for which the application 302 is invoked by the requesting entity. For an analytics application, the application resource 328-1 may be equipped with capabilities for running predictive analytics queries involving financial data, capabilities for analyzing data related to supply chain management, or capabilities for analyzing data related to manufacturing, by way of non-limiting example. The service capabilities of the application resource 328-1 may include user interface features specific to the application resource 328-1, such as a toolbar, data visualization (e.g., a dashboard), custom widgets, tabular navigation, text-entry fields, buttons, and blending, also by way of non-limiting example.

The application resource 328-1 may include a plurality of subservices involved in achieving the capabilities tracked by the service capabilities module 320. Each of the subservices may be configured to perform one or more functions associated with a capability. For instance, one of the subservices may be configured to receive and fulfill requests to retrieve information, another of the subservices may be configured to process and generate data according to a predictive model, and yet another of the subservices may be configured to provide load balancing. In some implementations, one or more of the subservices may be configured to perform a set of operations defined by a user that involve user-specified data.

The application resource 328-1 may also include an application resource data store that stores data specific to the application resource 328-1. As an example, for an application resource 328-1 that is configured for enterprise resource planning, the application data store may store data regarding revenue, forecasting, sales, available stock, price, cost, etc. The data specific to an entity or a user may include structured or unstructured data related to the purpose of the application resource 328-1. In some embodiments, the application resource data store may be configured to store data that is specific to an entity or a particular user, such as a set of customized features that differ from the defined configuration 308 for the application resource 328-1. The application resource data store may store data regarding a layout, color scheme, or other visual aspects to be presented in a user interface for the application 302. Such visual aspects may be linked to capabilities of the application resource 328-1, such as the ability to perform queries or run analytics to be displayed in a user interface for the application instance 330 to be instantiated.

In some embodiments, the application resource data store may store data regarding a set of service capabilities selected by the requesting entity (e.g., entity associated with computer system 206-1). During a setup process prior to or in connection with sending the request 208-1 (see FIG. 2), the requesting entity may select the application resource 328-1 that is appropriate for the entity's desired application (e.g., enterprise resource planning, mobile application deployment, internet-of-things). The application 302, as presented via a user interface, may have a defined configuration corresponding to the application resource 328-1 selected. During the setup process, the requesting entity may further customize the features provided via a user interface of the application 302 to the requesting entity, for example, by selecting which application features of the application resource 328-1 are supported or disabled, or specifying how application features of the application resource 328-If are to be modified. In some instances, the set of service capabilities may correspond to an upgraded version of the application resource 328-1 having features and/or capabilities different than the features and/or capabilities of a default configuration for the application resource 328-1.

Returning now to the application 302, in response to the request 334, the application resource 328-1 may provide, to the resource connector 312, capability information 336 indicating the service capabilities of the application resource 328-1, which may include customized capabilities. The resource connector 312 provides the capability information 336 to the application state configurator 306.

The application state configurator 306 compares the defined configuration provided in the information 308 with the capability information 336 and determines differences between the defined configuration and the capabilities in the capability information 336. The application state configurator 306 may modify the defined configuration specified in the information 308 based on the capability information 336. More particularly, the application state configurator 306 may enable additional features, disable features, or modify existing features of the defined configuration based on the capability information 336 to determine an application configuration for the application instance 330 to be instantiated for the application 302. The application configuration corresponds to the collection of features/capabilities to be provisioned in the application instance 330 presented to the requesting entity.

The application state configurator 306 selects, based at least in part on the defined configuration 308 application configuration determined, a set of features 338-1, 332-2, . . . 332-N (collectively "features 338") from among all available features of the application 302. Based on the features 338 selected, the application state configurator may recruit a set of the subservices of the application resource 328-1 that are appropriate to support the features 338 selected. For instance, the application state configurator 306 may send a request to allocate resources of the subservices corresponding to the set of features 338 to support operation of the application 302.

The application instance 330 instantiated to fulfill a request (e.g., request 208-1) from an external entity may include the set of features 338 corresponding to the defined configuration 308 corresponding to the resource identifier 316. More particularly, the set of features 338 may include enabled features, disabled features, supported features, and/or modified features. The application state configurator 306 may implement the set of features 338 based on a single source of truth, such as a hash table or a hash map, as described with respect to Table 2 and elsewhere herein. The set of features 338 may be further customized as a result of establishing a connection (e.g., connection 316-1) between one of the application resources 328 and the application 302. As an example, the application resource 328-1 may store a customization unique to the requesting entity that may be provided to the application state configurator 306, which may modify aspects of the set of features 338 based on the customization.

Figure 4:
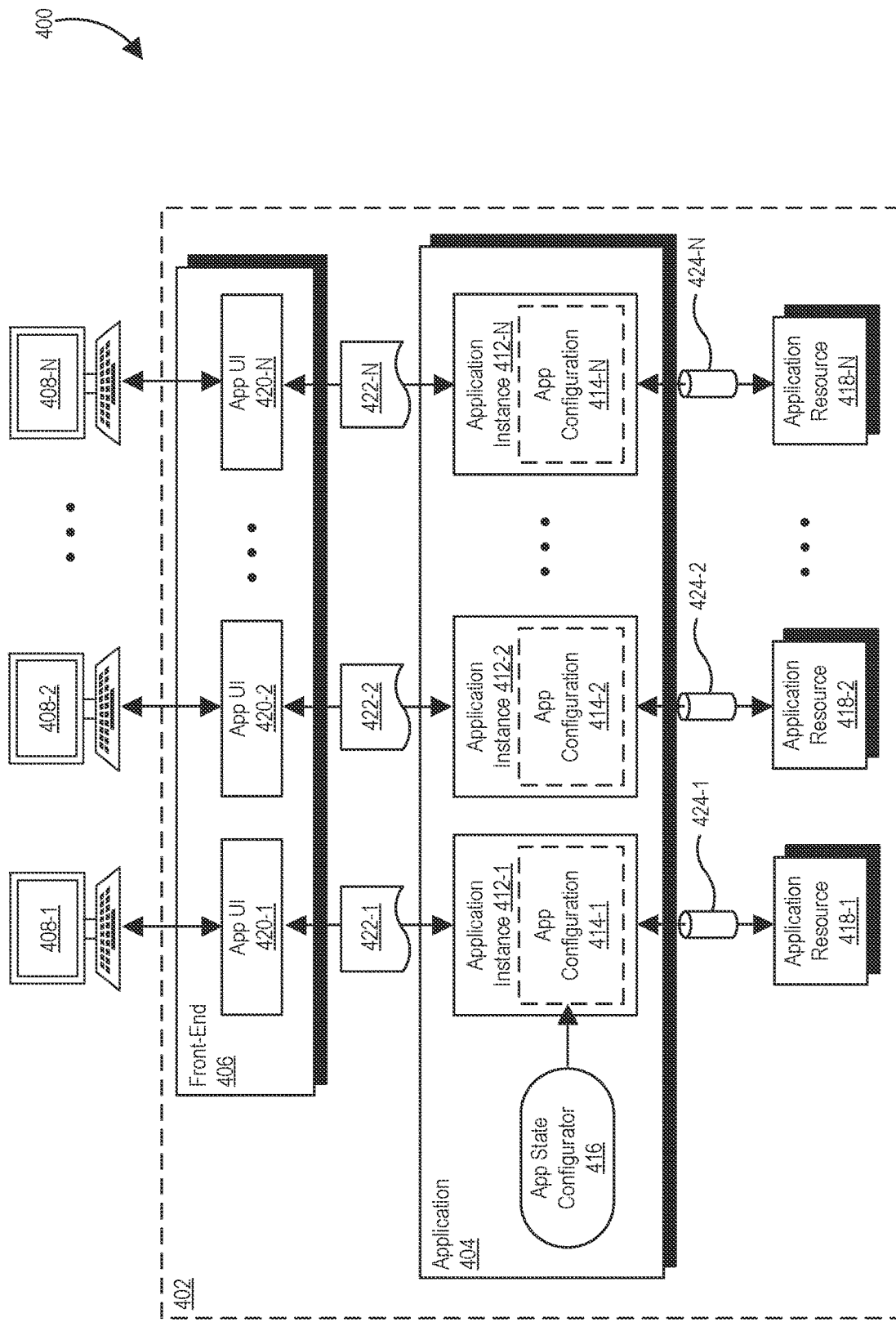
FIG. 4 illustrates a fourth environment in which a computer system of a computing resource service provider operates according to one or more embodiments.

FIG. 4 shows an environment 400 in which a computer system 402 of a computing resource service provider operates according to one or more embodiments. Various features of the environment 400 are substantially similar to those described with respect to FIGS. 1, 2, 3, and elsewhere herein, so further description thereof is omitted for brevity. The computer system 402 includes an application 404 supported by a plurality of application resources. The computer system 402 includes a front-end layer 406 that facilitates interaction with a set of computer systems 408-1, 408-2, . . . 408-N (collectively "computer systems 408") that are each associated with an entity external to the computer system 402 of the computing resources service provider. As described herein, the computer systems 408 establish a connection with the computer system 402 and request use of the application 404.

Each of the computer systems 408 may request a different set of features for the same application 404. A plurality of application instances 412-1, 412-2, . . . 412-N may be respectively provisioned for and corresponding to the computer systems 408-1, 408-2, . . . 408-N. Each of the application instances 412-1, 412-2, . . . 412-N (collectively "application instances 412") have an application configuration 414-1, 414-2, . . . 414-N (collectively "application configurations 414"). An application instance is a single copy of the application 402 operating using a corresponding application resource to provide a customized set of features to an external entity. In some implementations, a collection of computing resources, such as a defined area of memory and/or processing power (e.g., ratio of computing cycles, processing core), may be assigned to operate on behalf of a single instance of the application instances 412.

The application configurations 414-1, 414-2, . . . 414-N may each have a set of features determined and configured by an application state configurator 416, as described herein. The set of features comprising the application configurations 414 may include user interface features (e.g., buttons, data visualizations, toolbars) and a set of functional features associated with and/or supporting some or all of the user interface features. The application configurations 414 may each include a different layout for how the visual elements of the user interface are to be arranged and may each include a different color scheme, font, logo, etc., for each entity.

The set of features comprising an individual application configuration of the application configurations 414 may be supported by an application resource 418-1, 418-2, . . . 418-N on a back end of the computer system 402, as described with respect to FIG. 3. A first application resource 418-1 may support features of the application instance 412-1, a second application resource 418-2 may support features of the application instance 412-2, and so on. In some implementations, some of the application resources of one of the application instances 412 may also be included in application resources of another one of the application instances 412. For example, one or more application resources of the application resource 418-1 may also be included in the application resource 418-2.

The application configurations 414 also include features of a user interface of the application 404 presented on the computer systems 408. An application user interface 420-1 may be presented to the computer system 408-1, an application user interface 420-2 may be presented to the computer system 408-2, and so on. In some implementations, the application user interfaces 420-1, 420-2, . . . 420-N (collectively "application user interfaces 420") may look different and have a different collection of user input features. The application user interface 420-1 may, for example, have a database query tool supported by a first application resource whereas the application user interface 420-2 may not have a query database tool and therefore is not supported or connected to the first application resource. As another example, the application user interface 420-2 may have a dashboard for visualizing data, which is supported by a second application resource for processing data to be visualized and supported by a third application resource for visualizing the processed data whereas the application user interface 420-1 may not include such features and therefor is not connected to the second and third application resources.

The application instances 412 may send and receive data 422-1, 422-2, . . . 422-N to and from the application user interfaces 420-1, 420-2, . . . 420-N, respectively. The application user interfaces 420-1, 420-2, . . . 420-N may include display elements for presenting the data 422-1, 422-2, . . . 422-N to the computer systems 408-1, 408-2, . . . 408-N over one or more networks. The application user interfaces 420-1, 420-2, . . . 420-N may also include user input elements for receiving user input and sending data 422-1, 422-2, . . . 422-N to the application 402. One or more of the features included in the application configurations 414 may correspond to display elements or user input elements of the application user interfaces 420.

Connections 424-1, 424-2, . . . 424-N are established between the application 404 and the application resources 418-1, 418-2, . . . 424-N to facilitate the features of the customized application configurations 414-1, 414-2, . . . 414-N. The application instances 412-1, 412-2, . . . 412-N exchange data with the application resources 418-1, 418-2, . . . 418-N via the connections 424-1, 424-2, . . . 424-N. The application resources 418-1, 418-2, . . . 418-N process data on the back end of the computer system of the computing resources service provider in response to requests from the application instances 412-1, 412-2, . . . 412-N. In some implementations, a plurality of the application resources 418 may be assigned to a single application instance 412. For example, the application resources 328-1 and 328-2 described with respect to FIG. 3 may be assigned to perform operations for the application instance 412-1. A single application resource 418 may be assigned to support more than one of the application instances 412-1, 412-2, . . . 412-N. The application instances 418-1, 418-2, . . . 418-N may store data that is processed or manipulated in the associated application resource data store (e.g., application resource data store, 340) on behalf of the external entity for future use. Each of the application instances 412 is configured, at least in part, based on a defined configuration of a plurality of defined configurations, such as the defined configurations 220 described with respect to FIG. 2.

As a result of the foregoing features of a computer system of a computing resources service provider, an application may include set of features that is specific to a particular purpose for a user. As described herein, the particular purpose for which the set of features are configured are, in some embodiments, specific to an industry (e.g., healthcare, supply chain management, finance) or an intended application (e.g., virtual reality, gaming, internet-of-things). In some embodiments, some of the set of features of an application instance 412 may be selected by a user based on their preferences. Moreover, neither the users nor the computing resources service provider has to program or modify the source code of the application to achieve a desired set of features, including visual and functional aspects of the application. The operation and presentation of the application may instead be based on which application resources and/or data sources with which the application is connected.

Figure 5:
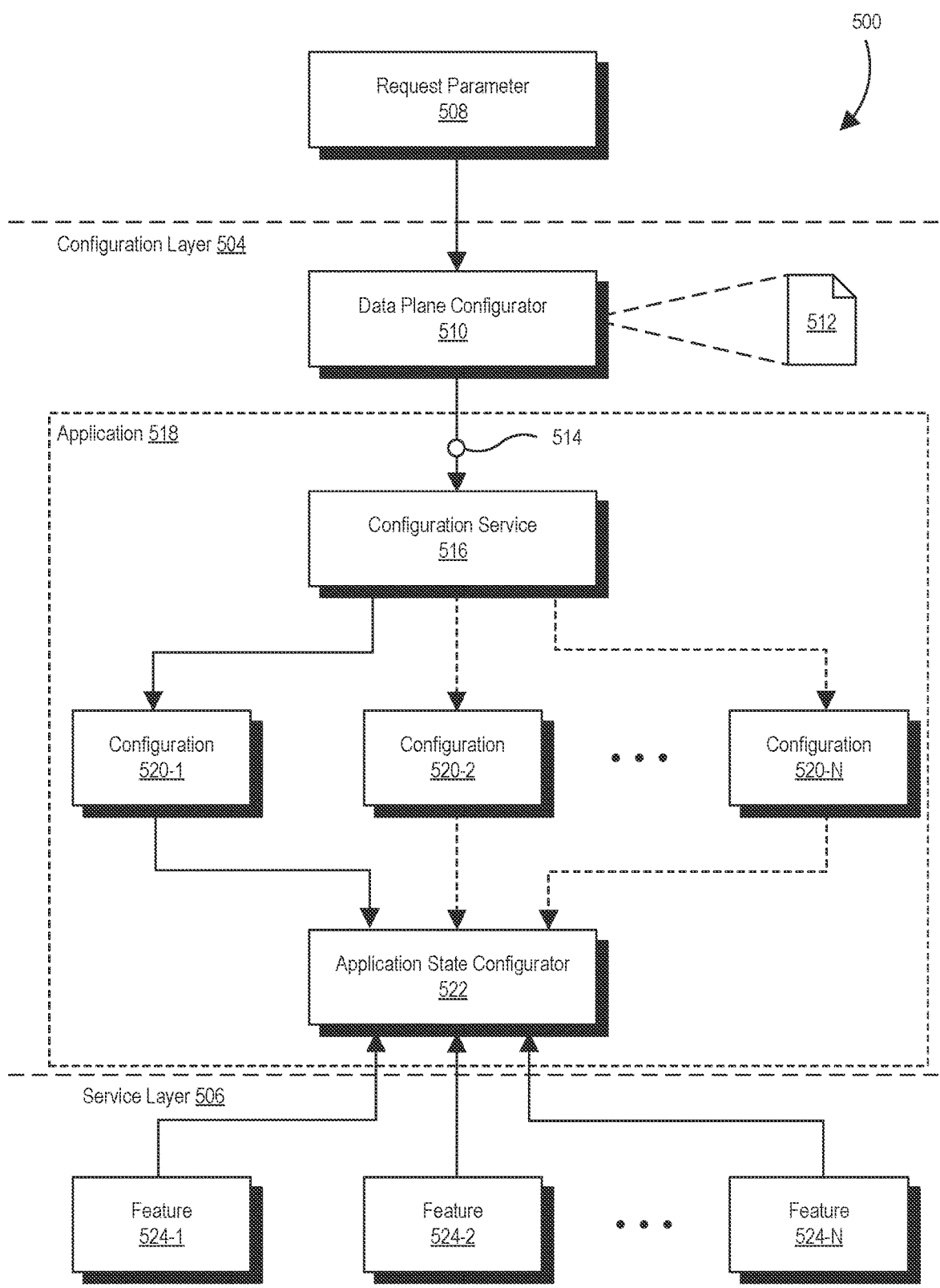
FIG. 5 illustrates a data flow process for determining and implementing a defined configuration for an application instance to be instantiated according to one or more embodiments.

FIG. 5 illustrates a data flow process 500 for determining and implementing a defined configuration for an application instance to be instantiated according to one or more embodiments. The process 500 is performed by various components of a computing system of a computing resources service provider, such as a front-end layer 502, a configuration layer 504, and a features library 506. The configuration layer 504 and/or the features library 506 are, in some embodiments, part of a back-end layer of a computer system architecture of the computing resources service provider. The term "front-end layer," as used herein, refers to a collection of one or more layers of a computer system architecture for presenting a user interface and enabling user interaction with other layers of the architecture. The term "back-end layer," as used herein, may be considered as including other layers not included in the front-end layer. The configuration layer 504 and the service layer 506 may cooperate to implement a defined configuration for the application.

A request parameter 508 is passed from the front-end layer 502 to a data plane configurator 510 in the configuration layer 504. The request parameter 508 provided by the front-end layer 508 includes one or more parameters of one of the requests 208, such as the request 208-1. The request parameter 508 includes at least the resource identifier 316 and may include other portions of the path 322, such as an identifier of the application 308. The data plane configurator 510 is a configuration service that receives the request parameter 508 and determines whether the request parameter 508 is valid.

In some embodiments, the data plane configurator 510 maps an application identifier in the request parameter 508 to one of the plurality of applications 108. The data plane configurator 510 maps a resource identifier in the request parameter 508 to a corresponding application resource of a plurality of application resources. For instance, the data plane configurator 510 may store data 512, such as a table or an array, specifying application identifiers for each of the plurality of applications 108 and specifying resource identifiers for each the plurality of the application resources 116. The data plane configurator 510 may compare the application identifier in the request parameter 508 with the application identifiers for the applications 108 in the data 512. The data plane configurator 510 compares the resource identifier in the request parameter 508 with the resource identifiers of the application resources 116 in the data 512.

As a result of determining a match between the identifiers in the request parameter 508 and identifiers in the data 512, the data plane configurator 510 dispatches a request 514 to a configuration service 516 of an application 518 to provision an instance of the application to the requesting entity. The application 518 may be an application of a plurality of applications of the computing resources service provider, as described with respect to FIG. 1 and elsewhere herein. As an example, the data plane configurator 510 may dispatch the request 514 to the application 518 corresponding to an application identifier in the request parameter 508. The request 514 includes a resource identifier of one or more application resources to be implemented in an application instance.

The configuration service 516 determines a defined configuration of a plurality of defined configurations 520-1, 520-2, . . . 520-N (collectively "defined configurations 520") to implement based the request 514 received. The configuration service 516, for instance, determines that the request 514 includes a resource identifier corresponding to the defined configuration 520-1. As a result, the configuration service 516 institutes the defined configuration 520-1 for an instance of the application 518. The configuration service 516 obtains configuration settings of the defined configuration 520-1, as described with respect to FIG. 2 and elsewhere herein.

The configuration service 516 provides the configuration settings of the defined configuration 520-1 to an application state configurator 522. The application state configurator 522 establishes a set of features 524-1, 524-2, . . . 524-N (collectively "features 524") for the instance of the application 518 to be instantiated. The application state configurator 522 generates a single source of truth for the set of features 524. The single source of truth may be a hash table, a hash map, or other such data structure in which a single value is associated with a feature of the features 524. Non-limiting examples of the features 524 include toolbars, user input features (e.g., buttons, sliders, text input), query fields (e.g., for database searches), data display features (e.g., dashboards, graphs). The features 524 are implemented in the application instance instantiated, as described with respect to FIG. 4 and elsewhere herein. Each of the features 524 may include data regarding a placement, color scheme, shape, feel, etc., of the feature in a user interface.

In operation, the application (e.g., application 108-1, 204, 308, 404, 512) does not access the application resources (e.g., application resources 116, 209, 328, 418) during runtime of the application or even by referring to the parameter 322. Instead, the application refers to the single source of truth to generate the user interface and link various functionality related to user interface features with the appropriate application resource. Each application instance therefore has its own single source of truth that is used to determine what user interface features are rendered for an application instance and which application resources are associated with the user interface features.

Figure 6A:
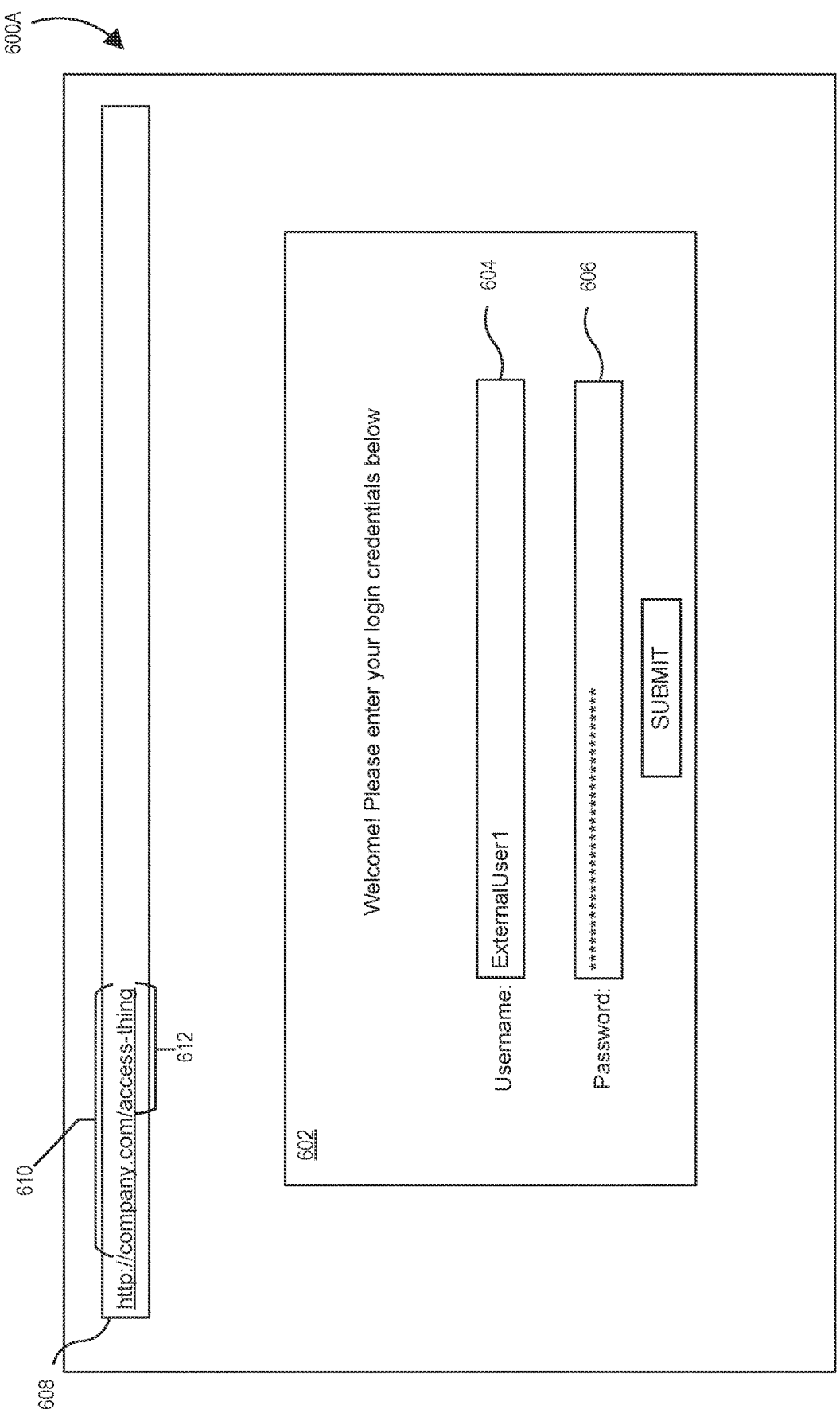
FIG. 6A illustrates a first user interface associated with an application of a computing resources service provider according to one or more embodiments.

FIG. 6A illustrates a first user interface 600A associated with an application of a computing resources service provider according to one or more embodiments. The user interface 600A is presented at a first time as a result of a user requesting access to the application, such as the application 108-1 described with respect to FIG. 1. The user interface 600A shown includes a login section 602 in which a user is prompted to provide credentials for authentication. The login section 602 includes a username input field 604 and a password input field 606.

The user interface 600A may be provided on a web browser or a dedicated application stored on a computing device of the user, such as a mobile device application or a desktop application. The user interface 600A, for instance, may include an input field 608 for entering a web address. To access the login section 602, the user navigates to a webpage having a web address 610 shown. The web address 610 includes a path 612 for accessing the particular application desired.

Figure 6B:
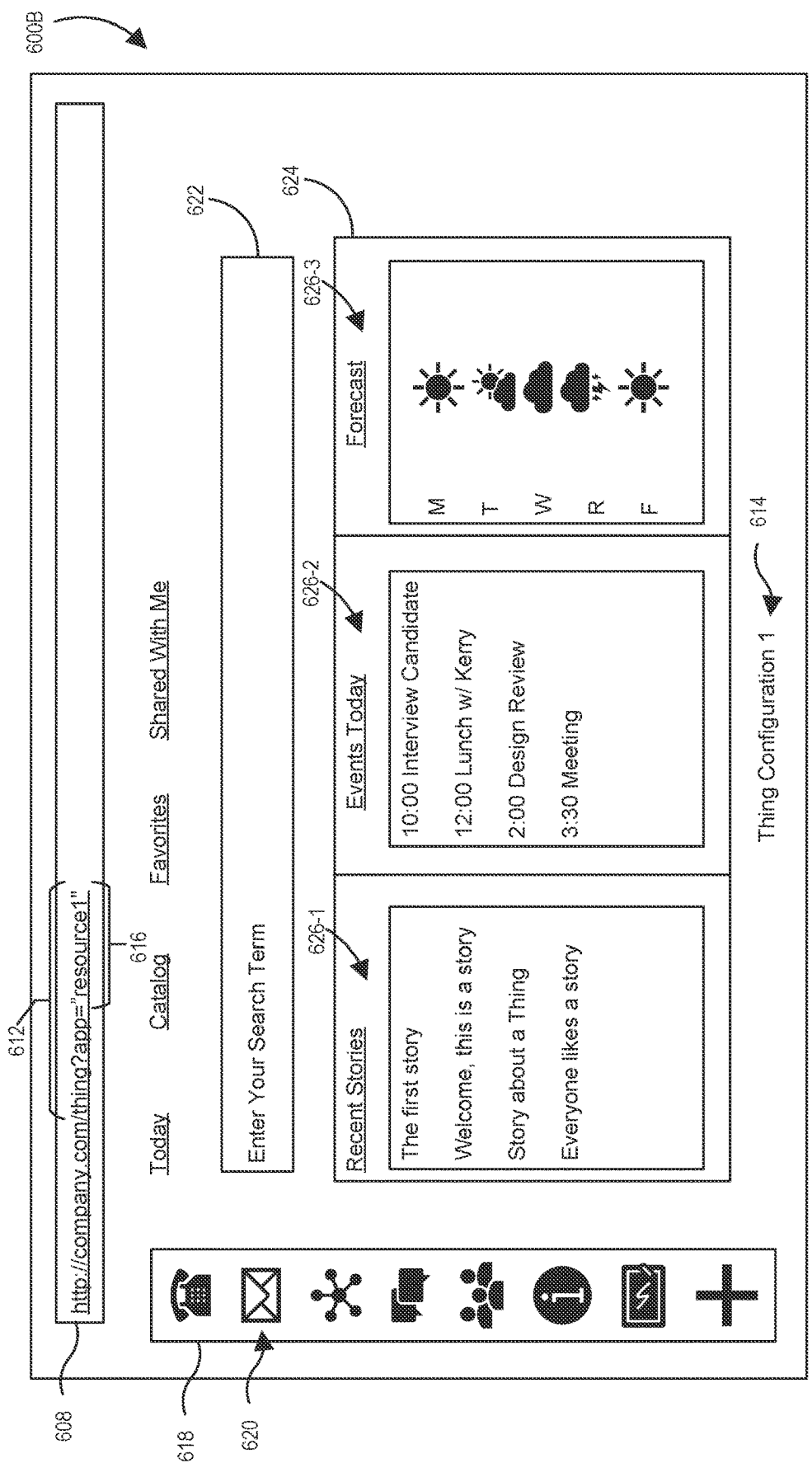
FIG. 6B illustrates a second user interface associated with an application of a computing resources service provider according to one or more embodiments.

FIG. 6B illustrates a second user interface 600B associated with an application of a computing resources service provider according to one or more embodiments. The user interface 600B is presented at a second time subsequent to the first time discussed with respect to FIG. 6A. The first user interface 600B may be presented in response to a determination by the computing system 102 of FIG. 1 that the credentials provided via the login section 602 are valid. The first user interface 600B may be associated with an instance of the application, such as the application instance 412-1 described with respect to FIG. 4. The user interface 600B has a first configuration 614 that corresponds to one of the plurality of defined configurations 220 discussed with respect to FIG. 2 and elsewhere herein.

The first configuration 614 may be presented as a result of a first resource identifier 616 being included in the path 612 of the web address 610. The first resource identifier 616 may be included in a request, by a computer application, that is not visible to a user—for example, via a request by a mobile device application dedicated to implementing one or more of the applications 108. In some embodiments, the first resource identifier 616 may be automatically populated in the web address 610 (or other similar input) by a computer device of a user based on data received by, e.g., the computer system 102 of the computing resource service provider (see FIG. 1). The computer system 102 of the computing resources service provider may generate the first user interface 600B as a result of receiving, from a computing device of the user over one or more networks, a request to provision an instance of an application, the request including the first resource identifier 616. More particularly, the computer system of the service provider determines the first configuration 614 from among a plurality of defined configurations based on the first resource identifier 616.

The first user interface 600B includes a toolbar 618 having a plurality of buttons, pieces of text, or other user input features 620 that can be interacted with to access or implement features of the application. The first user interface 600B also includes a search bar 622 for inputting an alphanumeric text phrase to be searched for by the application. The first user interface 600B further includes a panel 624 having a plurality of sections 626-1, 626-2, and 626-3 for displaying and/or accessing certain information.

The user interface features described with respect to the first user interface 600B are enabled or supported by an application resource corresponding to the first resource identifier 616. For instance, the first resource identifier 616 may identify the application resource 209-1 of the application 204 in FIG. 2. The application 204 may determine that the defined configuration 220-1 is the defined configuration of the defined configurations 220 that corresponds to the first resource identifier 616. The connection 234-1 is established between the application 204 and the application resource 209-1. The application resource 209-1 performs operations that support the features in the user interface 600B. By way of non-limiting example, the application resource 209-1 includes one of more processor-based devices that are configured to execute searches for phrases entered in the search bar 622.

Figure 6C:
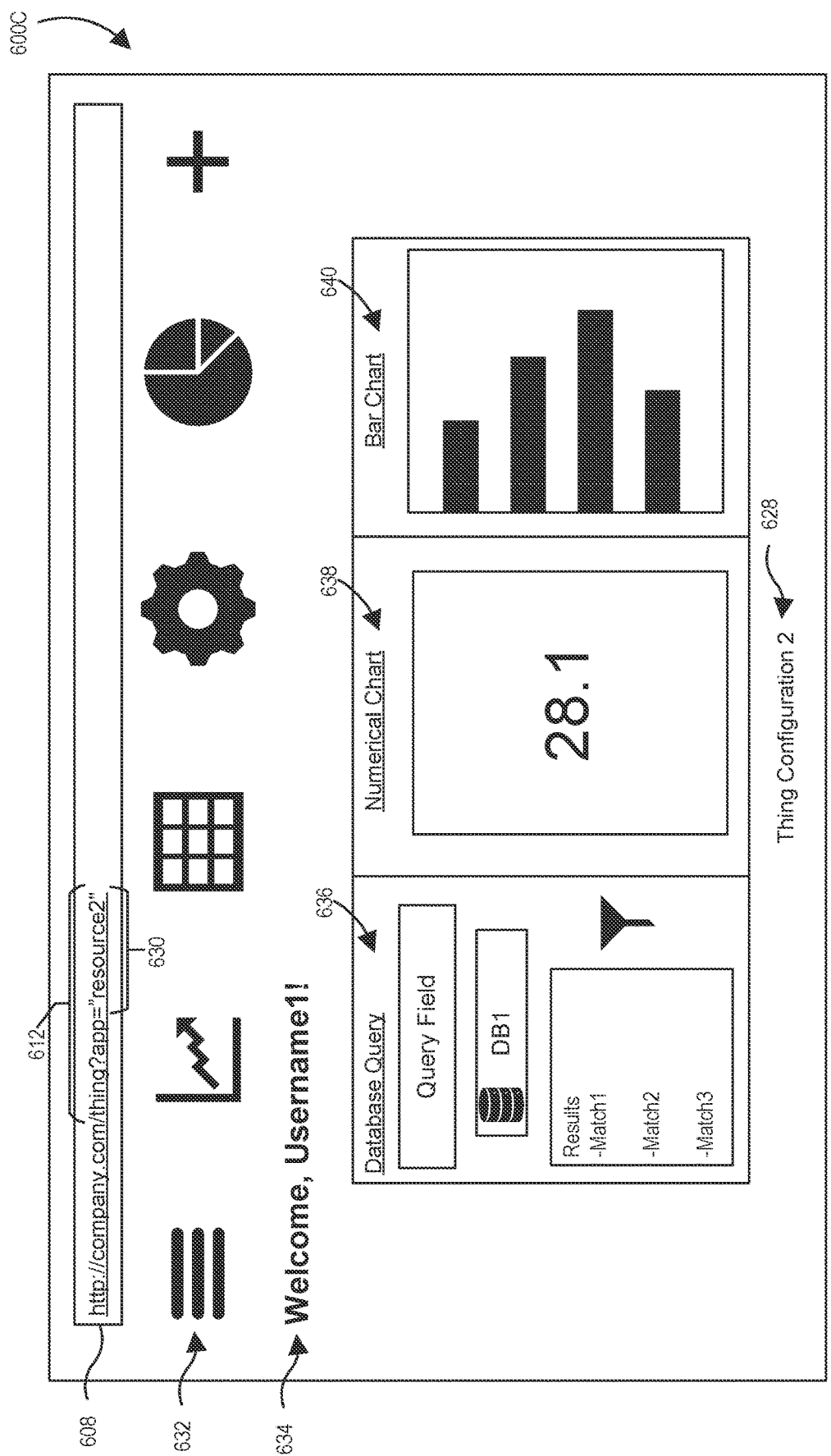
FIG. 6C illustrates a second user interface associated with an application of a computing resources service provider according to one or more embodiments.

FIG. 6C illustrates a third user interface 600C associated with an application of a computing resources service provider according to one or more embodiments. The user interface 600C is presented at a third time subsequent to the first time discussed with respect to FIG. 6A. The first user interface 600C may be presented in response to a determination by the computing system 102 of FIG. 1 that the credentials provided via the login section 602 are valid. The first user interface 600C may be associated with an instance of the application, such as the application instance 412-2 described with respect to FIG. 4. The user interface 600B has a second configuration 628 that corresponds to a different one of the plurality of defined configurations 220 than the first configuration 614, such as the defined configuration 220-2.

The second configuration 628 may be presented as a result of a second resource identifier 630 being included in the path 612 of the web address 610. The computer system 102 of the computing resources service provider may generate the second user interface 600C as a result of receiving, from a computing device of the user over one or more networks, a request to provision an instance of an application, the request including the second resource identifier 630. More particularly, the computer system of the service provider determines the second configuration 628 from among a plurality of defined configurations based on the second resource identifier 630.

The second user interface 600C of the application includes a different set of user interface features than the first user interface 600B. The second user interface 600C includes a plurality of icons 632 with which a user can interact to access information stored in memory accessible by the application resource or perform functions supported by the application resource, such as the application resource 209-2. The second user interface 600C also includes a welcome banner 634 that may be personalized based on the credentials provided by the user at the login section 602. The second user interface 600C further includes a database query section 636, a first dashboard 638 for displaying numerical data, and a second dashboard 640 for displaying representations of data in graph form.

The application resource corresponding to the resource identifier 630, such as the application resource 209-2, is configured to access data associated with features of the second user interface 600C and/or perform operations associated with features of the second user interface 600C. For instance, the application resource 209-2 may be configured to access a database (e.g., data store 230) and retrieve requested data therefrom as a result of user interaction via the database query section 636. As another example, the application resource 209-2 may access certain data, process the data, and send the processed data over the connection 234-2 to be displayed in the first dashboard 638 or the second dashboard 640.

The first and second user interfaces 600B and 600C may differ from each other in a number of other respects, such as in layout and color scheme, by way of non-limiting example. As discussed herein, the defined configuration for the first user interface 600B may be designed for a first use case whereas the defined configuration for the second user interface 600C may be for a second use case. The first user interface 600B may be for human resources management, for example, whereas the second user interface 600C may be for supply chain management. As also described herein, one application resource may support the features of the first user interface 600B while a different application resource may support the features of the second user interface 600C. Both application resources as well as the user interfaces 600B and 600C, however, are still parts of the same application. As a result, the computing resources service provider does not have to create a different application for each customer; instead, a different configuration can be created for categories of use cases (e.g., healthcare, supply chain management, human resources) without redesign of the entire application.

Figure 7:
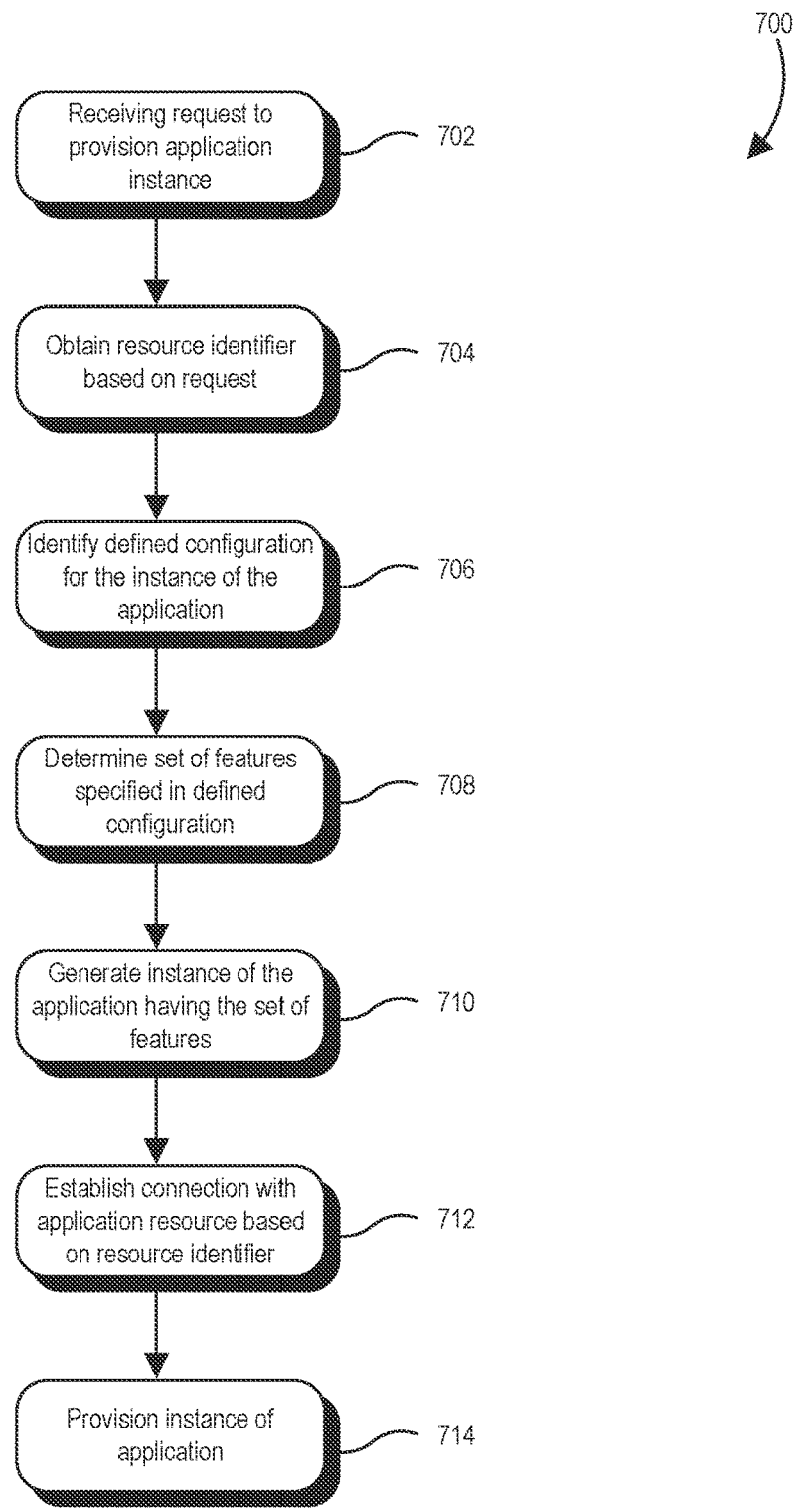
FIG. 7 illustrates a method for configuring an application based on a resource identifier according to one or more embodiments.

FIG. 7 illustrates a method 700 for configuring an application based on a resource identifier according to one or more embodiments. The method 700 may be performed by any appropriate entity or combination of entities described herein, such as the computer system 102 of the computing resources service provider. The method 700 includes receiving, at 702, a request to provision a first instance of an application for an external entity. The request may be received from a computer system of an external entity over one or more networks.

The method 700 also includes obtaining, at 704, a resource identifier based on the request received in 702. In some embodiments, obtaining the resource identifier includes extracting the resource identifier from a path in a web address included in the request. In some embodiments, obtaining the resource identifier includes obtaining the resource identifier from data storage based on authentication information provided by the first external entity. For instance, the resource identifier may be stored in data storage in association with an identifier of the external entity. The computer system of the service provider may obtain the resource identifier from data storage using identifying information of the external entity.

The method 700 further includes identifying, at 706, a defined configuration of a plurality of defined configurations for the application based on the resource identifier. As described with respect to FIG. 2, the computer system may compare the resource identifier in the request 208-1 with a plurality of identifiers that are associated with the plurality of defined configurations 220. The computer system may determine that the resource identifier is a match with an identifier of the defined configuration 220-1.

The method 700 includes determining, at 708, a set of features specified in the defined configuration identified in 706. For instance, the computer system may determine the set of features as described with respect to FIG. 2. The method 700 also includes generating, at 710, the instance having the set of features determined in 708. The application instance may be generated as described with respect to FIG. 3. The method 700 includes establishing, at 712, a connection with an application resource of a plurality of application resources of the application based on the resource identifier. The source connector described with respect to FIGS. 2 and 3 may establish a connection 316-1 between the application instance 330 generated and the application resource 328-1.

The application resource 328-1 connected performs operations to support the set of features of the application instance. The method 700 further includes provisioning, at 712, the instance of the application having the set of features to the external entity over one or more networks. For example, a user interface having the set of features may be generated and provided to the computer system of the external entity over one or more networks. The user interface, in some embodiments, has an arrangement specified in the defined configuration.

Figure 8:
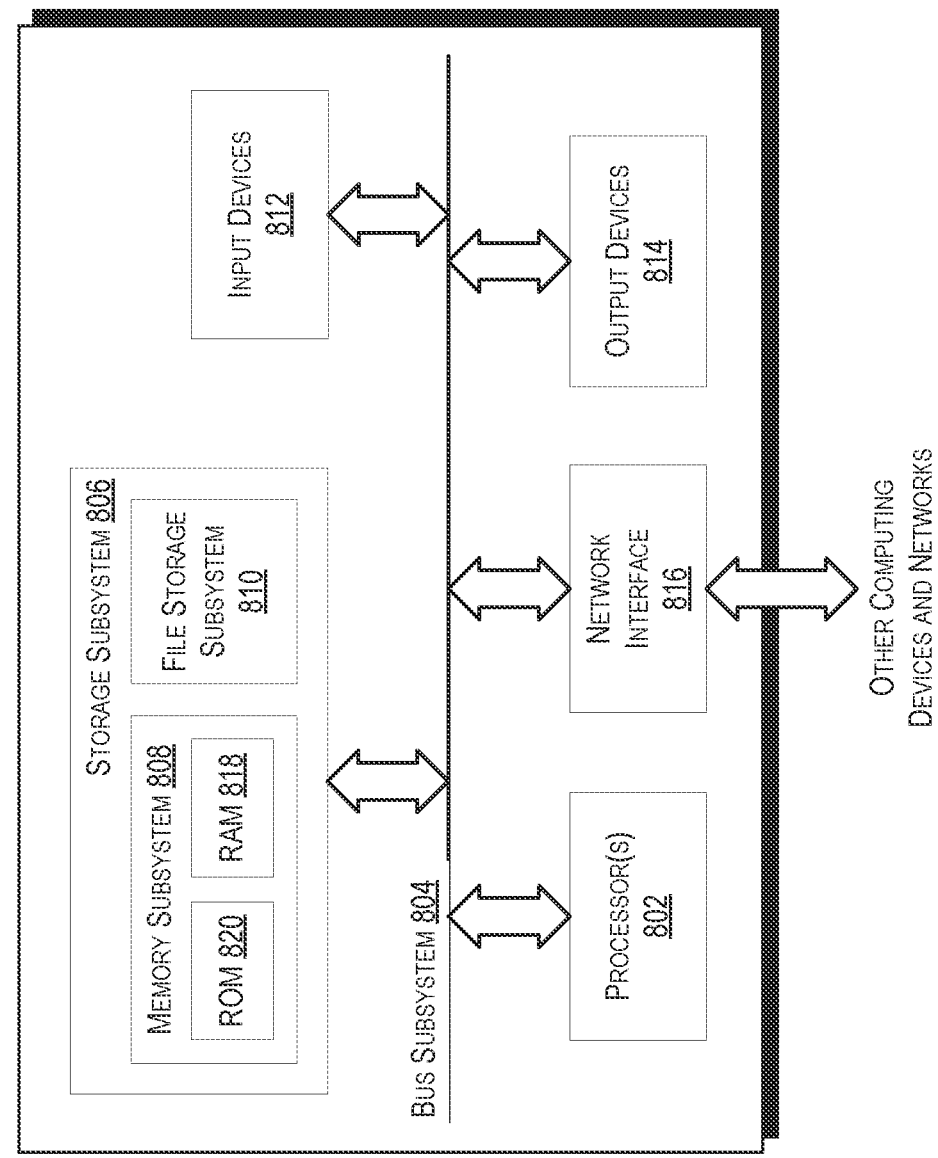
FIG. 8 illustrates hardware of a special purpose computing machine configured according to one or more embodiments.

FIG. 8 illustrates an example computer system 800 for configuring an application based on a resource identifier according to one or more embodiments. The software servers together may form a cluster, or logical network of computer systems programmed with software programs that communicate with each other and work together to process requests.

An example computer system 810 is illustrated in FIG. 8. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable mediums.

Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein. In the Internet example, software components or services may reside on multiple different computer systems 810 or servers across the network. The processes described above may be implemented on one or more servers, for example. A server may transmit actions or messages from one component, through the Internet, a local network 820, and network interface 804 to a component on computer system 810. The software components and processes described above may be implemented on any computer system and send and/or receive information across a network, for example.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices may include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

Based on the above disclosure and the following claims, other arrangements, embodiments, implementations and equivalents will be evident to those skilled in the art and may be employed without departing from the spirit and scope of the disclosure as defined by the claims. The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims. The above description illustrates various embodiments of the present disclosure along with examples of how aspects of the present disclosure may be implemented. The above examples and embodiments should not be deemed to be the only embodiments and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

The invention claimed is:

1. A method, comprising:
receiving a first request to provision a first instance of an application for a first external entity;
obtaining a first resource identifier based on the first request;
identifying a first defined configuration of a plurality of defined configurations for the application based on the first resource identifier;
determining a first set of features specified in the first defined configuration;
generating the first instance having the first set of features;
establishing, by the application, a connection with a first application resource of a plurality of application resources of the application based on the first resource identifier;
determining, by the application, a set of capabilities to be provided to the first instance based on the first application resource; and
provisioning, over one or more networks, the first instance having the first set of features to the first external entity,
wherein the method further comprising:
comparing the first resource identifier with a plurality of identifiers that are respectively associated with the plurality of defined configurations; and
determining that the first resource identifier is a match with an identifier of the first defined configuration, wherein the first defined configuration is identified based on the match.

2. The method of claim 1, comprising:
receiving a second request to provision a second instance of the application for a second external entity;
obtaining a second resource identifier based on the second request;
identifying a second defined configuration of the plurality of defined configurations for the application based on the second resource identifier;
determining a second set of features specified in the second defined configuration;
generating the second instance having the second set of features;
establishing, by the application, a connection with a second application resource of the plurality of application resources of the application based on the second resource identifier; and
provisioning, over one or more networks, the second instance having the second set of features to the second external entity.

3. The method of claim 1, wherein the first resource identifier is extracted from a path in a web address included in the first request.

4. The method of claim 1, wherein the first resource identifier is obtained from data storage based on authentication information provided by the first external entity.

5. The method of claim 1, comprising:
updating a data structure to include associations between states for the first set of features and hash values associated with the first set of features, wherein the first instance is generated based on the data structure.

6. The method of claim 1, wherein the first application resource is configured to perform operations to support the first set of features of the first defined configuration.

7. The method of claim 1, wherein generating the first instance includes generating a user interface having the first set of features, the user interface having an arrangement specified in the first defined configuration.

8. The method of claim 7, comprising:
accessing, by the first application resource, data that is associated with the first external entity in data storage, wherein the user interface includes a feature representing the data accessed.

9. A system, comprising:
one or more processors; and
memory storing instructions that, as a result of execution by the one or more processors, cause the system to:
receive a request to provision an instance of an application for an external entity;
obtain a resource identifier based on the request;
identify a defined configuration of a plurality of defined configurations for the application based on the resource identifier;
determine a set of features specified in the defined configuration;
generate the instance having the set of features;
establish, by the application, a connection with an application resource of a plurality of application resources of the application, the application resource corresponding to the resource identifier;
determine, by the application, a set of capabilities to be provided to the first instance based on the first application resource; and
provision, over one or more networks, the instance having the set of features to the external entity,
wherein the set of capabilities are stored in a data structure including a feature name associated with a feature, a hash generated based on the feature name, and a value associated with the state of the feature.

10. The system of claim 9, wherein the resource identifier is extracted from a path in a web address included in the request.

11. The system of claim 9, comprising:
update a data structure to include associations between states for the set of features and hash values associated with the set of features, wherein the instance is generated based on the data structure.

12. The system of claim 9, wherein the application resource is configured to perform operations to support the set of features of the defined configuration.

13. The system of claim 9, execution of the instructions causing the system to:
access, by the application resource, data that is associated with the external entity in data storage, wherein the instance provisioned includes a feature representing the data accessed.

14. One or more non-transitory computer readable media storing instructions that, as a result of execution by one or more processors, cause the one or more processors to:
- receive a request to provision an instance of an application for an external entity;
- obtain a resource identifier based on the request;
- identify a defined configuration of a plurality of defined configurations for the application based on the resource identifier;
- determine a set of features specified in the defined configuration;
- generate the instance having the set of features;
- establish, by the application, a connection between an application resource of a plurality of application resources and the application based on a correspondence of the application resource to the resource identifier;
- determine, by the application, a set of capabilities to be provided to the first instance based on the first application resource; and
- provision, over one or more networks, the instance having the set of features to the external entity,
- wherein the set of capabilities are stored in a data structure including a feature name associated with a feature, a hash generated based on the feature name, and a value associated with the state of the feature.

15. The one or more non-transitory computer readable media of claim 14, wherein the resource identifier is obtained from data storage based on authentication information provided by the external entity.

16. The one or more non-transitory computer readable media of claim 14, wherein execution of the instructions causes the one or more processors to:
- update a data structure to include associations between states for the set of features and hash values associated with the set of features, wherein the instance is generated based on the data structure.

17. The one or more non-transitory computer readable media of claim 14, wherein execution of the instructions causes the one or more processors to:
- compare the resource identifier with a plurality of identifiers that are respectively associated with the plurality of defined configurations; and
- determine that the resource identifier is a match with an identifier of the defined configuration, wherein the defined configuration is identified based on the match.

18. The one or more non-transitory computer readable media of claim 14, wherein execution of the instructions causes the one or more processors to:
- access, by the application resource, data that is associated with the external entity in data storage, wherein the user interface includes a feature representing the data accessed.

* * * * *